(12) United States Patent
Koerber et al.

(10) Patent No.: US 6,601,466 B2
(45) Date of Patent: Aug. 5, 2003

(54) CONTROL ARRANGEMENT FOR ADJUSTABLE HOUSING

(75) Inventors: Sabine Koerber, Ludwigsburg (DE); Bernhard Lucas, Besigheim (DE); Dirk Langenhan, Vaterstetten (DE)

(73) Assignee: Robert Bosch GmbH, Stuttgart (DE)

( * ) Notice: Subject to any disclaimer, the term of this patent is extended or adjusted under 35 U.S.C. 154(b) by 47 days.

(21) Appl. No.: 09/862,806

(22) Filed: May 22, 2001

(65) Prior Publication Data

US 2002/0000909 A1 Jan. 3, 2002

(30) Foreign Application Priority Data

May 23, 2000 (DE) .......................................... 100 25 501

(51) Int. Cl.[7] .............................................. F16H 27/02
(52) U.S. Cl. ........................ 74/89.13; 74/89.23; 74/423; 74/417
(58) Field of Search ............................ 74/89.13, 89.23, 74/89.29, 89.34, 423, 413, 414, 417

(56) References Cited

U.S. PATENT DOCUMENTS

| 5,099,400 A | * | 3/1992 | Lee | 362/37 |
|---|---|---|---|---|
| 5,313,213 A | * | 5/1994 | Neumann et al. | 342/165 |
| 5,355,287 A | * | 10/1994 | Denley | 74/89.13 |
| 5,429,011 A | * | 7/1995 | Stevenson | 74/89.13 |
| 5,483,426 A | * | 1/1996 | Lewis et al. | 74/89.13 |
| 5,508,896 A | * | 4/1996 | Suehiro et al. | 74/89.13 |
| 5,580,148 A | * | 12/1996 | Liao | 362/493 |
| 5,909,949 A | * | 6/1999 | Gotoh | 362/37 |
| 5,961,294 A | * | 10/1999 | Hataura et al. | 74/89.13 |
| 6,155,376 A | * | 12/2000 | Cheng | 74/89.13 |

FOREIGN PATENT DOCUMENTS

| DE | 42 01 214 C1 | 2/1993 |
|---|---|---|
| DE | 199 24 055 A1 | 12/2000 |

* cited by examiner

Primary Examiner—Thomas R. Hannon
Assistant Examiner—Bradley J. Van Pelt

(57) ABSTRACT

A control arrangement for an adjustable housing of a radar sensor has a holder on which a position of the housing is changeable by at least one adjusting screw which is turnable by a regulatable adjusting drive, and a control electronic unit provided for adjustment, via which said signals produced by the radar signal are evaluated or adjusting data stored in a storage are read, supplied to the corresponding adjusting drive and the position response command signals are transmitted to the corresponding adjusting drives.

12 Claims, 2 Drawing Sheets

CONTROL ARRANGEMENT FOR ADJUSTABLE HOUSING

BACKGROUND OF THE INVENTION

The present invention relates to a control arrangement for an adjustable housing.

More particularly it relates to a control arrangement for an adjustable housing of a radar sensor which is mounted outside on a vehicle.

As a rule, such a radar sensor is mounted on a holder by screws outside on a vehicle. The radar sensor can be for example a component of a distance warning system, in which continuously informations about the distance and/or the relative speed of the vehicle to other vehicles or to street objects can be processed. It is therefore necessary to orient the radar sensor very accurately on the longitudinal axis of the vehicle. Partially because of significant vehicle tolerances in the region of the mounting point, an adjustment of the sensor after the incorporation in the vehicle is required.

It is disclosed in the not published DE 199 24 055.8 A1 that the radar sensor after the mounting can be adjusted by manual turning of two adjusting screws by means of a deviating transmission from above, from below or laterally. The difficulty is to find a mounting space for the radar sensor, which provides on the one hand a sufficient place and satisfies the high frequency requirements, and on the other hand makes possible a simple and therefore inexpensive adjustment of the radar sensor at the end of the manufacturing process.

Frequently the accessibility of the adjusting screws is difficult because of the very narrow space conditions in the vehicles, so that the adjustment can be performed by means of a car lift or similar auxiliary means. Recesses for through-going passages in the region of the abutment rods, which can facilitate the accessibility, generally can not be provided from design reasons.

The German patent document DE 42 01 214 C1 discloses that the adjusting process of the radar sensor can be performed by means of an adjusting headlight which together with the radar sensor is arranged on an adjustment plate. The adjustment plate cooperates via the adjusting headlight with an adjusting motor which acts on the adjusting screws, so that the radar sensor can be oriented properly to the radar target.

SUMMARY OF THE INVENTION

Accordingly, it is an object of the present invention to provide a control arrangement for an adjustable housing of the above mentioned general type, with which the position of the housing, for example for a radar sensor can be changeable by at least one adjusting screw.

In keeping with these objects and with others which will become apparent hereinafter, one feature of the present invention resides, briefly stated in a control arrangement for an adjustable housing, in particular for a radar sensor, which has at least one adjusting screw for changing a position of said housing a regulating adjusting drive for turning said at least one adjusting screw; a control electronic unit provided for adjustment, which evaluates signals produced by a radar sensor are evaluated, the signals are supplied to said adjusting drive, and position response command signals are determined by a corresponding one of the adjusting drives.

In accordance with another embodiment of the present invention, a control arrangement for an adjustable housing is provided, in particular for a radar sensor, which has at least one adjusting screw, a holder on which a position of said housing is changeable by said at least one adjusting screw; a regulatable adjusting drive which turns said at least one adjusting screw; a control electronic system provided for adjustment so that adjustment data are stored in storage and are readable through said control electronic system, supplied to a corresponding one of said adjustment drives, and position response signals of corresponding adjustment drives are determined.

Since the at least one adjusting screw is turnable by a regulatable adjusting drive, the rotation of the adjusting screw can be taken here by a drive, which must not be accessible for the adjustment. For adjustment, in advantageous manner a control electronic system is provided, through which the signals produced by the radar sensor are evaluated, supplied to the corresponding adjusting drive, and the position response signals of the corresponding adjusting drive are determined.

In the manufacturing chain of a motor vehicle with a radar sensor after the positioning of the vehicle on an adjusting place, the adjustment can be performed automatically and therefore in a time saving manner. By the automatic course, the errors failures can be eliminated, and moreover a self adjustment of the radar sensor is performed when a misalignment is detected.

In accordance with an alternative embodiment of the inventive control arrangement, the control electronic system is formed so that, adjustment data stored in a storage, they are supplied to a corresponding adjusting drive and the position response signals of the corresponding adjusting drive are determined. The control electronic system transfers, as in the previous embodiment, the adjusting commands to the drive, which sends a position response command to the control electronic unit. In this way an automatic processing of adjustment and a post adjustment correction is possible, wherein the adjustment algorithm can be stored in the control electronic system.

The invention can be realized in a simple manner when at least one adjusting screw is provided on the holder with a deviating transmission, through which a rotary spindle is guidable on the base plate on the holder outwardly. The adjustment is then actuatable through a rotation of the rotary spindle for turning the at least one adjusting screw in the screw thread. The deviating transmission can include bevel gears or a screw shaft or a spur gear.

In accordance with another embodiment of the present invention, for example a linear drive can be coupled directly or through a coupling to the adjusting screw. The housing of the radar sensor is mountable by three screws on the holder, and two diagonal opposite screws are each guided as adjusting screws. The adjusting drive can be formed in an advantageous manner as a stepper motor which is self-locking when not supplied with current.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
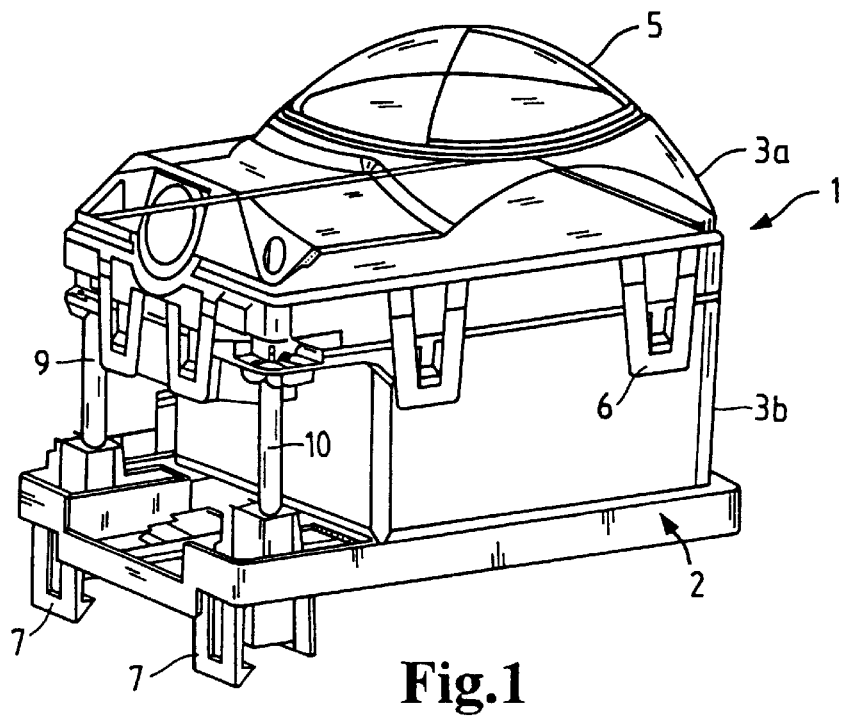
FIG. 1 is a view showing a radar sensor with an adjustable holder in accordance with the present invention.

FIG. 1 shows a perspective view of a distance sensor 1 which is formed as a radar sensor. In principle it corresponds to a distance sensor which is known from the prior art. The distance sensor 1 is mounted in a compact housing 3 through a holder 2, for mounting on a motor vehicle. The housing 3 is assembled from a lower housing part 3b and an upper housing part 3a.

The both housing parts 3a and 3b of this known sensor 1 are connected with one another by clamp connections 6. A lense 5 for focusing of the radar beam of the distance sensor 1 is arranged in the upper housing part 3a. The housing 3 of the distance sensor 1 is mounted by screws 9 and 10 on the holder 2. A further screw is provided on a corner of the sensor 1 which is covered by the housing 3b. The holder 2 has a catching or snapping elements 7 for an engagement in corresponding recesses on the body of a motor vehicle. Of course, a plurality of other mounting possibilities can be provided as well.

Figure 2:
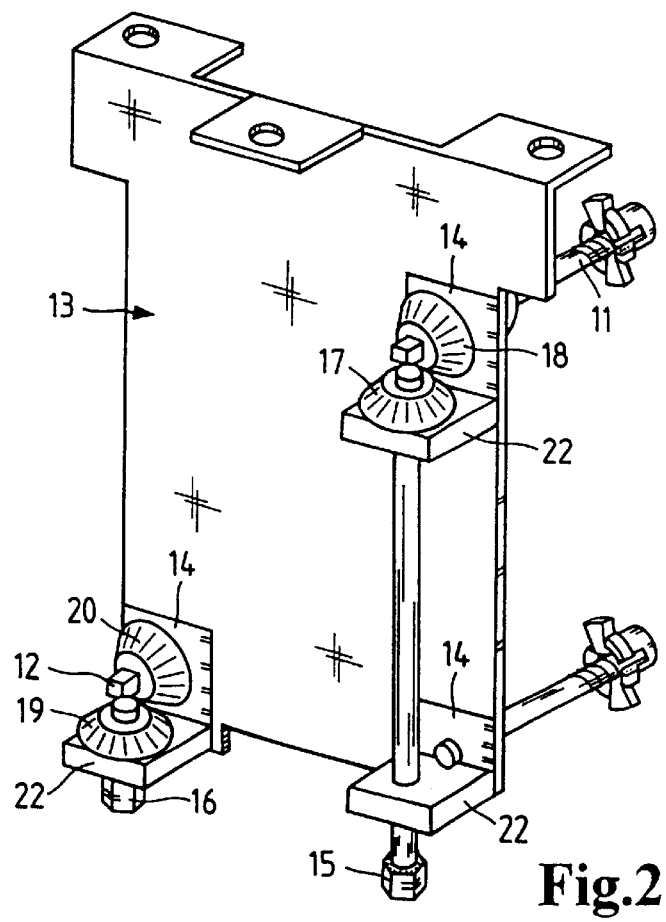
FIG. 2 is a view showing a base plate of a holder with two adjusting screws with a deviating transmission.

The screws 9, 10 and 11 shown in FIG. 2 engage in screw regions of the holder 2. They have a spherical screw head which is supported in a correspondingly shaped receptacle of the housing 3. The housing 3 is moveable and thereby relative adjustable to the holder 2. The screws 9 and 10 as well as the not shown screws form, because of their L-shaped arrangement, a three-point support. The screw 10 and the not shown screw form two visible bearings for the horizontal and vertical adjustment of the housing 3 (adjustment screws) and the screw 9 forms a fixed bearing.

Screwing in or screwing out of for example the adjusting screw 10 in the associated screw region causes a tilting of the sensor 1 about an axis which extends through the suspension point of the screw 9 and the not shown screw 11. Screwing in or screwing out of for example the not visible adjusting screw 11 in the associated screwing region causes a tilting of the sensor 1 about an axis which extends through the suspension point of the screws 9 and 10.

FIG. 2 shows an operation of the arrangement for manually adjustable adjusting screws 11 and 12 on a holder 13, which is described in the not published German patent document DE 199 24 055.8 A1. With this guidance of the adjusting screws 11 and 12, an adjustment of a distance sensor is possible, which substantially corresponds to the sensor 1 shown in FIG. 1. The adjusting screws 11 and 12 are turned with a self-locating thread in the synthetic plastic insert 14 located on the holder 13. It is however provided that no rotary movement is possible on the screw heads located forwardly which for example can be performed by a covering on the sensor housing.

The adjusting screws 11 and 12 of FIG. 2 are adjustable from below, in particular actuatable through a rotary spindle 15, 16. Here a deviation of the rotary direction of the rotary spindle 15 and 16 by 90° is provided by bevel gears 17 and 19 on the adjusting screws 11 and by bevel gears 19 and 20 on the adjusting screw 12. The bevel gears 17 and 19 are fixedly connected with the corresponding rotary spindle 15 and 16, for example by shrinking on or by a force connection through a hexagon or another suitable shape, for example a semi-circle.

The support of the rotary spindles 15 and 16 is provided directly on the holders 13. The end of the rotary spindles 15 and 16 has a screw head which can be designed in accordance with the applications, for example formed as a hexagon. The bevel gears 18 and 20 are formed-lockingly connected through the four-cornered ends of the adjusting screws 11 and 12. The bevel gears 18 and 19 are movable parallel to the axis of the adjusting screws 11 and 12 within certain limits. The pressing of the bevel gears 18 and 20 against the bevel gears 17 and 19 can be performed by a spring or by a suitable design of the synthetic plastic.

When for example the rotary spindle 15 is rotated, then the bevel gear 17 and 18 and also the adjusting screw 11 are rotated. By the specific, thread-guiding support of the adjusting screw 11 in the synthetic plastic inserts 14 of the holder 13, the adjusting screw 11 is turned in or turned out relative to the holder 13. The bevel gear 18 is moved along the axis of the adjusting screw 11. The execution of the screwing movement for adjustment of the above described radar sensor is performed at 90° offset relative to the direction of the adjusting screws 11 and 12. In the drawings the possibilities of an adjustment from below is shown. Here however, also an adjustment from above or from left or from right laterally is possible. For, this purpose however the arrangement of the bevel gears relative to one another must be changed.

In accordance with a not shown different embodiment of the deviating transmission of FIG. 2, also a screw check or a spur gear can be provided, which operates in the same manner as the bevel gears for changing of the rotary direction.

Figure 3:
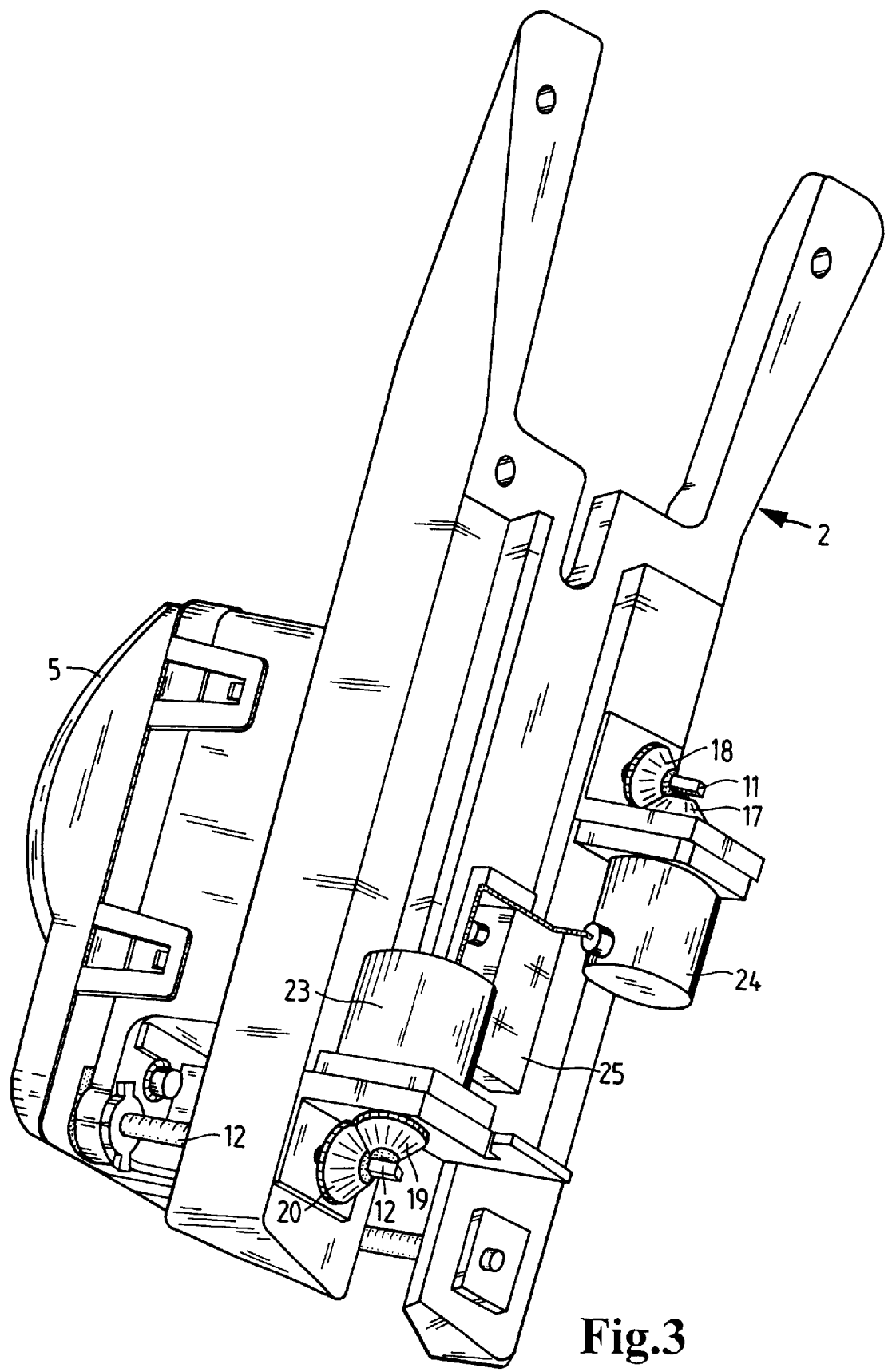
FIG. 3 is a view showing an inventive arrangement of adjusting drives on two adjusting screws.

FIG. 3 shows a complete arrangement of the inventive holder for an adjustable housing. The components which correspond to the components mentioned herein below are identified with the same reference numerals. The both adjusting screws 11 and 12, as described above, are screwed with self-locating threads in the holder 2. They are turned in accordance with the invention by stepper motors 23 and 24 which form an adjusting drive. The stepper motors are fixedly mounted on the holder 2. The stepper motors 23 and 24 are preferably formed as self-locking motors when no current is supplied.

A drive circuit and a control logic of the control electronic unit 25 for the stepper motors 23 and 24 are accommodated in a separate housing which is mounted on the holder 2. The control electronic unit 25 is connected with a not shown central sensor electronic unit, through which also the voltage supply for the stepper motors 23 and 24 is performed. The control electronic unit 25 transmits adjustment commands to the stepper motors 23 and 24, which also send a position response to the control electronic unit 25.

It will be understood that each of the elements described above, or two or more together, may also find a useful application in other types of constructions differing from the types described above.

While the invention has been illustrated and described as embodied in control arrangement for adjustable housing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A control arrangement for an adjustable housing of a radar sensor, comprising at least one adjusting screw; a holder on which a position of said housing is changeable by said at least one adjusting screw; a regulating adjusting drive for turning said at least one adjusting screw; a control electronic unit connectable with the sensor and provided for receiving signals produced by a radar sensor, transmitting adjustment commands to said adjusting drive and receiving position response from said adjusting drive; a holder with a deviating transmission provided on said at least one adjusting screw; and a rotary spindle which is outwardly guidable via said deviating transmission on a base plate of said holder, so that an adjustment is performed by turning of said rotary spindle for turning of said at least one adjusting screw in a screw thread.

2. A control arrangement as defined in claim 1, wherein said deviating transmission includes bevel gears.

3. A control arrangement as defined in claim 1, wherein said adjusting drive is coupled to said adjusting screw.

4. A control arrangement as defined in claim 1, wherein said housing is mounted on said holder by three screws including two diagonally located screws and formed as adjusting screws.

5. A control arrangement as defined in claim 1, wherein said adjusting drive is formed as a stepper motor which is self-locking when no current is applied.

6. A control arrangement for an adjustable housing of a radar sensor, comprising at least one adjusting screw; a holder on which a position of said housing is changeable by said at least one adjusting screw; a regulatable adjusting drive which turns said at least one adjusting screw; a control electronic unit connectable with the sensor and provided for reading adjustment data stored in storage, transmitting adjustment commands to said adjustment drive, and receiving position response from said adjustment drive; and a holder with a deviating transmission provided on said at least one adjusting screw; a rotary spindle which is outwardly guidable through said deviating transmission on a base plate of said holder, so that an adjustment is performed by turning of said rotary spindle for turning of said at least one adjusting screw in a screw thread.

7. A control arrangement as defined in claim 6, wherein said deviating transmission includes bevel gears.

8. A control arrangement as defined in claim 6, wherein said adjusting drive is coupled to said adjusting screw.

9. A control arrangement as defined in claim 6, wherein said housing is mounted on said holder by three screws including two diagonally located screws and formed as adjusting screws.

10. A control arrangement as defined in claim 6, wherein said adjusting drive is formed as a stepper motor which is self-locking when no current is applied.

11. A control arrangement for an adjustable housing of a radar sensor, comprising at least one adjusting screw; a holder on which a position of said housing is changeable by said at least one adjusting screw; a regulating adjusting drive for turning said at least one adjusting screw; a control electronic unit connectable with the sensor and provided for receiving signals produced by the radar sensor, transmitting adjustment commands to said adjusting drive and receiving position response from said adjusting drive.

12. A control arrangement for an adjustable housing of a radar sensor, comprising at least one adjusting screw; a holder on which a position of said housing is changeable by said at least one adjusting screw; a regulatable adjusting drive which turns said at least one adjusting screw; a control electronic unit connectable with the sensor and provided for reading adjustment data stored in storage, transmitting adjustment commands to said adjustment drive, and receiving position response from said adjustment drive.

* * * * *